United States Patent
Sahejpal et al.

(10) Patent No.: US 6,265,995 B1
(45) Date of Patent: Jul. 24, 2001

(54) METHOD AND APPARATUS FOR CONVERTING BETWEEN A LOGICAL BLOCK ADDRESS (LBA) AND A MINUTE SECOND FRAME (MSF) LOCATION ON A DATA CARRIER SUCH AS A CD-ROM

(75) Inventors: Neeraj Sahejpal, Milpitas; Gene Weddle, San Jose, both of CA (US)

(73) Assignee: Oak Technology, Inc., Sunnyvale, CA (US)

(*) Notice: Subject to any disclaimer, the term of this patent is extended or adjusted under 35 U.S.C. 154(b) by 0 days.

(21) Appl. No.: 09/471,628

(22) Filed: Dec. 24, 1999

(51) Int. Cl.[7] ....................................... H03M 7/00
(52) U.S. Cl. ........................ 341/95; 341/85; 341/84
(58) Field of Search ............................ 341/95, 50, 85, 341/84

(56) References Cited

U.S. PATENT DOCUMENTS

| | | | | |
|---|---|---|---|---|
| 4,266,281 | * | 5/1981 | Struger et al. | 712/245 |
| 4,847,759 | * | 7/1989 | Oklobdzija | 712/207 |
| 5,668,989 | * | 9/1997 | Mao | 341/85 |

\* cited by examiner

*Primary Examiner*—Howard L. Williams
*Assistant Examiner*—Jean Bruner Jeanglaude
(74) *Attorney, Agent, or Firm*—Young Law Firm, P.C.

(57) ABSTRACT

An LBA/MSF converter includes a decade selector, the decade selector receiving a first input and generating a decade selector output corresponding to a decade of the first input. An operand selector receives the decade selector output and outputs an operand corresponding to the decade selector output. An adder outputs the sum of the first input and the operand, the sum being an MSF value corresponding to the first input when the first input is an LBA value, and a subtractor outputs the difference of the first input and the operand, the difference being an LBA value corresponding to the first input when the first input is an MSF value. A method of converting between an LBA and an MSF location on a data carrier includes steps of receiving a first input, determining a decade of the received first input, selecting an operand corresponding to the determined decade, adding the first input and the selected operand to generate a first output, the first output being an MSF location when the received first input is an LBA address, and subtracting the selected operand from the first input to generate a second output, the second output being an LBA address when the received first input is an MSF location. Such methods and devices allow the conversion between LBA and MSF address formats of a data carrier such as a CD-ROM without invoking the functional block(s) of the electronic design automation software predefined for that purpose.

13 Claims, 2 Drawing Sheets

METHOD AND APPARATUS FOR CONVERTING BETWEEN A LOGICAL BLOCK ADDRESS (LBA) AND A MINUTE SECOND FRAME (MSF) LOCATION ON A DATA CARRIER SUCH AS A CD-ROM

BACKGROUND OF THE INVENTION

1. Field of the Invention

This invention relates to devices and methods for converting between a logical block address (LBA) expressed in hexadecimal (Hex) format and a minute second frame (MSF) location expressed in binary coded decimal (BCD) format on a data carrier, such as a compact disk read only memory (CD-ROM).

2. Description of the Related Art

When designing decoder circuits to decode information stored on data carriers such as CD-ROMs, it is often necessary to design or to use predefined logic to convert between a logical block address (LBA) expressed in hexadecimal (numbering system having a radix of 16, hereafter "Hex") format and a minute second frame (MSF) location expressed in binary coded decimal (more specifically, the 8421 BCD code, hereafter "BCD") format. Indeed, the location of information stored on CD-ROMs is expressed in MSF format, while the decoder and the host most often express addresses as LBA, which are expressed in Hex format. Such logic may be incorporated as a functional block in electronic design automation (EDA) software, which is a generic term for a class of software tools that help engineers develop integrated circuits (ICs). Such tools convert a high level descriptive language, such as VERILOG® or VHDL (IEEE 1076 standard) into a logical gate representation that may be implemented in silicon. To translate the high level descriptive language into a logical gate representation typically requires a compile operation. Providers of such EDA software, such as Synopsis, Inc. of Mountain View, Calif. sell licenses to companies wishing to use their software. The number of compile operations that may be carried out simultaneously is limited to the number of licenses that are purchased. If all of the licenses that have been purchased are currently in use, integrated circuit designers wishing to invoke the functional block that converts between LBA and MSF address locations are prevented from doing so, thereby decreasing their productivity. In turn, this may increase the time to market and/or cost of the resultant IC design.

It is, therefore, desirable to provide methods and devices to convert between LBA and MSF address formats of a data carrier such as a CD-ROM without invoking the functional block(s) of the EDA software predefined for that purpose. It is also desirable to provide methods and devices to quickly and efficiently convert between LBA and MSF address formats without resorting to the traditional methods carried out by such predefined functional block, which convert between codes by dividing and multiplying by 16. Such methods and devices, moreover, should yield a lower resultant gate count than the aforementioned predefined functional blocks, at least for 8 bit applications.

SUMMARY OF THE INVENTION

The present invention, therefore, provides methods and devices to convert between LBA and MSF address formats of a data carrier such as a CD-ROM without invoking the functional block(s) of the EDA software predefined for that purpose. The present invention also provides methods and devices to quickly and efficiently convert between LBA and MSF address formats without resorting to the traditional methods carried out by such predefined functional block, which convert between codes by dividing and multiplying by 16.

In accordance with the principles of the invention above and those that will be mentioned and will become apparent below, a binary coded decimal (BCD)/hexadecimal (HEX) converter, according to the present invention, comprises a decade selector, the decade selector receiving a first input and generating a decade selector output corresponding to a decade of the first input; an operand selector, the operand selector receiving decade selector output and outputting an operand corresponding to the decade selector output; an adder, the adder outputting a sum of the first input and the operand, the sum being a BCD value corresponding to the first input when the first input is a Hex value, and a subtractor, the subtractor outputting a difference of the first input and the operand, the difference being a Hex value corresponding to the first input when the first input is a BCD value.

According to further embodiments, the decade selector may be configured to receive n numbered second inputs, each of the n second inputs being tied to a respective different multiple of 10, the decade selector matching the decade of the first input to one of the multiples of 10, the decade selector output being equal to the number of the second input tied to the matching multiple of 10. The operand selector may be configured to receive p numbered third inputs, the number p being equal to n, each of the p third inputs being tied to a respective different multiple of 6, the operand outputted being equal to that multiple of 6 tied to the numbered third input that matches the decade selector output. One or more of the decade selector, the operand selector, the adder and the subtractor may be implemented in firmware. Alternatively, one or more of the decade selector, the operand selector, the adder and the subtractor may be implemented in software. Alternatively still, one or more of the decade selector, the operand selector, the adder and the subtractor may be implemented in hardware.

The present invention may also be viewed as a method of converting between a logical block address (LBA) and a minute second frame (MSF) location on a data carrier, comprising the steps of receiving a first input; determining a decade of the received first input; selecting an operand corresponding to the determined decade; adding the first input and the selected operand to generate a first output, the first output being an MSF location when the received first input is an LBA address, and subtracting the selected operand from the first input to generate a second output, the second output being an LBA address when the received first input is an MSF location.

The determining step may comprise the step of ascertaining a number of decade boundaries crossed by the first input. The determining step may comprise the steps of receiving n numbered second inputs, each of the n second inputs being tied to a respective different multiple of 10 and matching the decade of the first input to one of the multiples of 10, the determined decade being equal to the number of the second input tied to the matching multiple of 10. The selecting step may comprise the step of receiving p numbered third inputs, p being equal to n, each of the p third inputs being tied to a respective different multiple of 6, the operand outputted being equal to that multiple of 6 tied the numbered third input that matches the determined decade. The data carrier may be, for example, a CD-ROM.

According to another aspect thereof, the present invention may be viewed as a method of performing a seek operation on a data carrier that stores information at a location specified in a minute second frame (MSF) format, based upon a logical block address (LBA), comprising the steps of determining a number of decade boundaries crossed by the LBA of information to be accessed on the data carrier; performing an addition operation to add an operand to the LBA, the operand being equal to 6 multiplied by the number of decade boundaries crossed by the LBA, a result of the addition operation corresponding to a MSF location of the information to be accessed; issuing a seek command specifying the MSF location; receiving an MSF position signal from a read-write head over the data carrier; performing a subtraction operation to subtract an operand from the MSF position signal, the operand being equal to 6 multiplied by the number of decade boundaries crossed by the MSF position signal, a result of the subtraction operation corresponding to an LBA representation of the MSF position signal, and comparing the LBA representation of the MSF position signal with the LBA of the information to be accessed on the data carrier to determine whether the LBA of the information to be accessed has been reached.

BRIEF DESCRIPTION OF THE DRAWINGS

For a further understanding of the advantages of the present invention, reference should be made to the following detailed description, taken in conjunction with the accompanying figures, in which.

DESCRIPTION OF THE INVENTION

Figure 1:
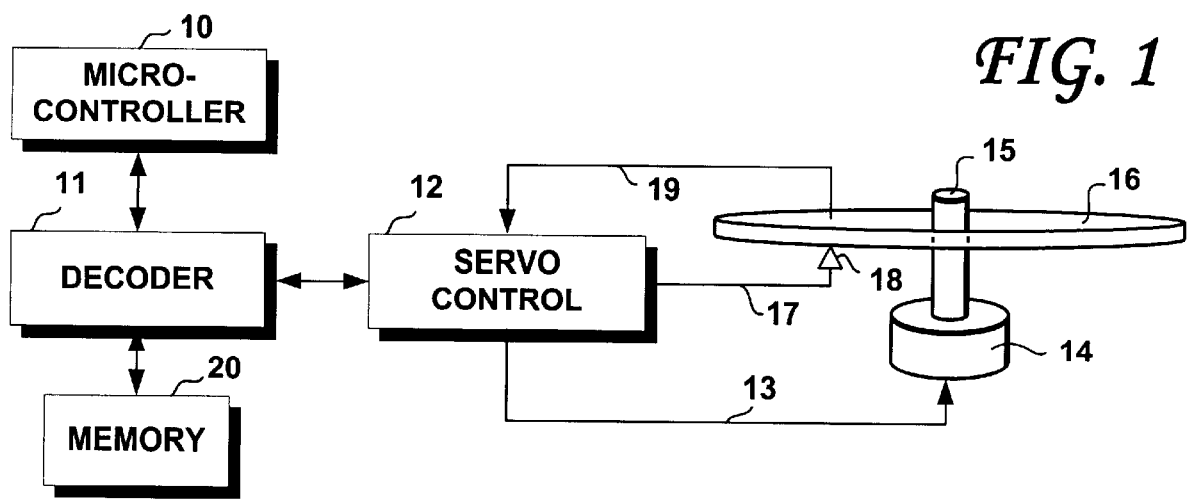
FIG. 1 is a block diagram of drive electronics for reading (and writing, as appropriate) to a data carrier, suitable for implementing the present invention.

FIG. 1 is a block diagram of drive electronics for reading (and writing, as appropriate) to a data carrier, suitable for implementing the present invention. For example, the data carrier may be a CD-ROM and the drive electronics shown in FIG. 1 may be suitable for controlling seek operations to read and/or write data from and/or to the CD-ROM. As shown therein, a microcontroller 10 is coupled to a multimedia (graphics, video and/or audio) decoder circuit 11. The microprocessor 10 controls the data flow within the decoder 11. The decoder 11 may also be coupled to a memory 20, such as a Dynamic Random Access Memory (DRAM) frame buffer, via a memory controller (not show) to control memory accesses to and from the memory 20. The decoder 11, in turn, is coupled to a servo control circuit 12. The servo control circuit 12 controls the rotation of the disk 16 (such as a CD-ROM) and controls accesses (seeks) to the disk 16 to retrieve information therefrom. As shown in FIG. 1, the servo control 12 generates a spindle control signal 13 that is fed to the spindle motor 14. The spindle motor 14 rotates a spindle 15 (at constant angular velocity or "CAV", for example) and causes the disk 16 to rotate. The servo control also generates a disk access signal 17, which causes a head 18 (such as an optical head) to sweep across the disk 16 to access a predetermined address (location) on the disk. For example, the head 18 sweeps across the disk 16 to reach a predetermined address specified as an MSF location, in response to a seek command issued by the microcontroller 10 or by a host (not shown) coupled thereto. The predetermined address may be specified as an LBA by the decoder 11, the microcontroller 10 and/or the host, while the locations on the disk 16 may be specified as MSF locations. In sweeping across the disk 16 toward the MSF location corresponding to the predetermined LBA, a position signal 19 may be generated and fed back to the servo control circuit 12. In response thereto, the servo control circuit 12 may change the disk access signal 17 as needed, in order to compensate for any over or undershoot of the target location.

Figure 2:
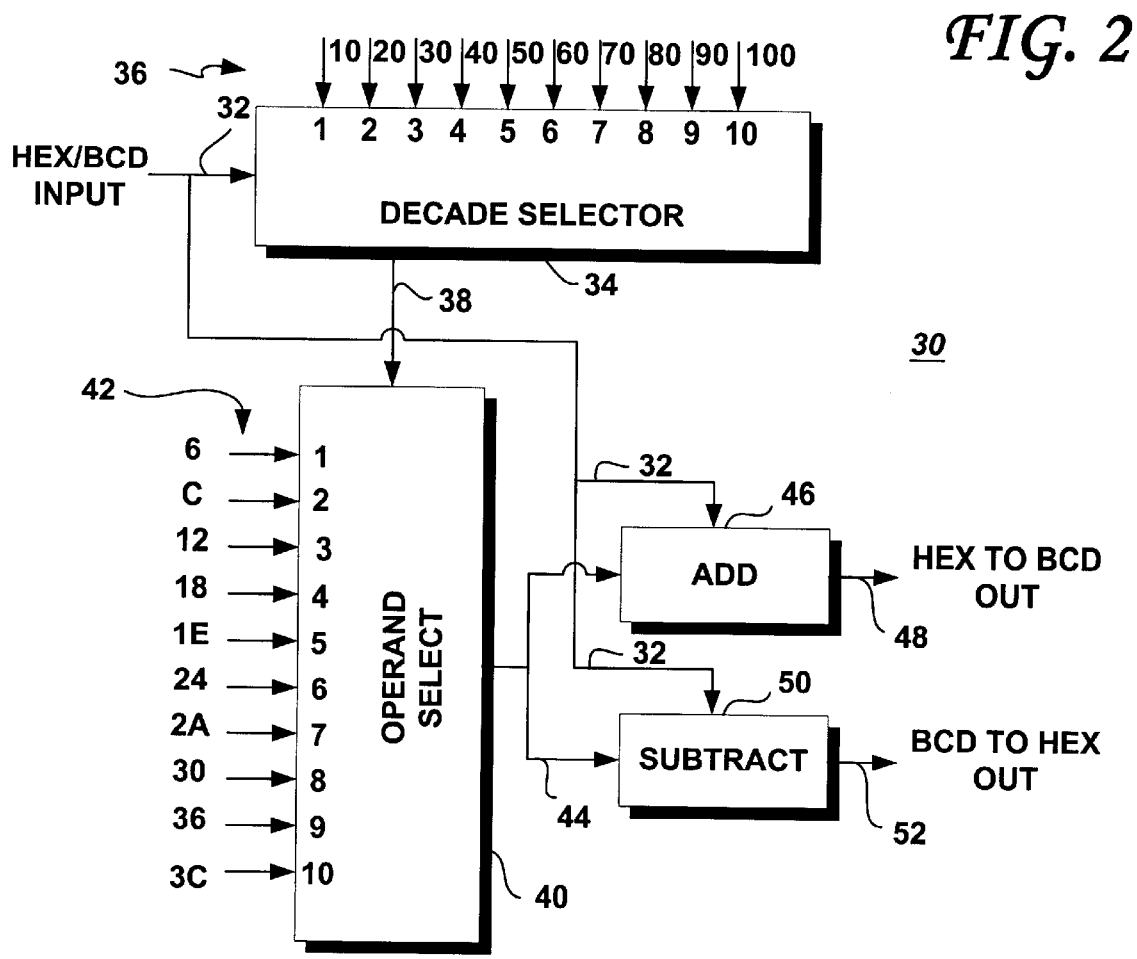
FIG. 2 is a functional block diagram of a converter for converting between LBA- and MSF-format addresses, according to an embodiment of the present invention.
Figure 3:
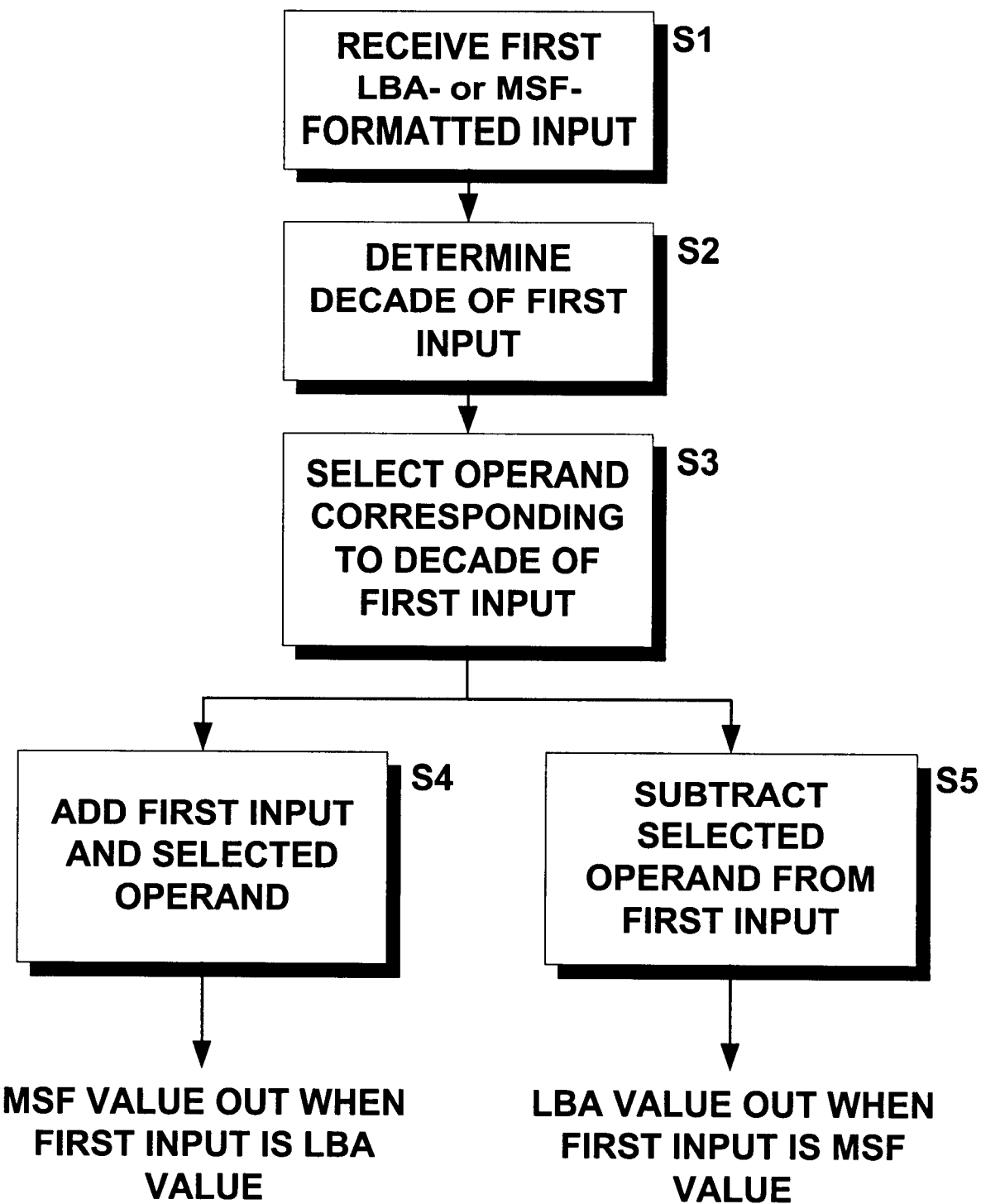
FIG. 3 is a flowchart of an embodiment of a method according to the present invention.

According to the present invention, the decoder 11 converts between the predetermined LBA address and the corresponding MSF location according to the devices and/or methods illustrated in FIGS. 1 through 3. The functionality shown in FIGS. 1 through 3, according to the present invention, may be implemented in software, hardware, firmware or any combination thereof As shown in FIG. 2, a binary coded decimal (BCD)/ hexadecimal (HEX) converter 30, according to the present invention, includes a decade selector 34 that receives a first input 32. In response to the first input 32, the decade selector 34 generates a decade selector output 38 corresponding to a decade of the first input. Specifically, the decade selector 34 compares the first input 32 with n numbered second inputs 36, each of the n second inputs 36 being tied to a respective different multiple of 10. Indeed, as shown in FIG. 2, the second input 1 is tied to a value of 10, the second input 2 is tied to a value of 20, the third second input 3 is tied to a value of 30, and so on through the second input 10 tied to the value 100. It is to be noted that although only 10 such second inputs 36 are shown in FIG. 2 for illustrative purposes only, the decade selector 34 may be adapted to receive any number of such second inputs 36. The decade selector 34 compares its first input 32 to each of the values tied to its numbered second inputs 36 and matches the decade of the first input to one of the multiples of 10. The output 38 of the decade selector 34 is then equal to the number of the second input 36 tied to the matching multiple of 10. For example, if the decimal equivalent of the first input is 78, the output 38 of the decade selector 34 will be equal to 7, 7 being the number of the second input 36 whose decade matches the value tied to the $7^{th}$ second input 36. The decade of the decimal equivalent of the first input 32 may alternatively be found by dividing the decimal equivalent of the first input by 10 decimal and ignoring the remainder. In the example given, if the decimal equivalent of the first input 32 is 78, then 78/10=7.8 and the decade selector will select second input 36 number 7 and output same at 38.

The output of the decade selector 38 is coupled to the operand select 40. Operand select 40 receives the decade selector output 38 and outputs an operand 44 corresponding to the decade selector output 38. Specifically, the operand selector 40 may be configured to receive p numbered third inputs 42, the number p being equal to n. Each of the p third inputs 42, as shown in FIG. 2, is tied to a respective different multiple of 6 decimal (the multiples of 6 decimal being shown in hexadecimal format). As shown, the third input 42 numbered 1 is tied to a value of 6, the third input 42 numbered 2 is tied to a value of Ch (the lower case "h" denoting a Hex value), the third input 42 numbered 3 is tied to a value of 12 h and so on until third input 42 numbered 10, which is tied to a value of 3 Ch. The operand 44 outputted by the operand select 40 is equal to that multiple of 6 tied the numbered third input 42 that matches the decade selector output 38. Continuing with the example above, if the decade selector output 38 is 7, the operand select 40 will output the value 2 Ah as the operand selected at its output 44, because 2 Ah is the value tied to that third input 42 (numbered 7) that matches the decade selector output 38.

The selected operand 44 (the output of the operand select 40) is coupled to an adder 46 and to a subtractor 50. The first input 32 is also coupled to the adder 46 and to the subtractor 50. The adder 46 outputs the sum of the first input 32 and the selected operand 44, whereas the subtractor 50 outputs the difference of the first input 32 and the selected operand 44. According to the present invention, when the first input 32 is a Hex value, the adder 46 outputs a value 48 corresponding to the BCD equivalent of the first input 32. Similarly, when the first input 32 is a BCD value, the subtractor 50 outputs a value 52 corresponding to the Hex equivalent of the first input 32. In this manner, when an LBA, expressed in Hex, is input as the first input 32, the adder output 48 is a value corresponding to the MSF equivalent thereof, which MSF address is expressed in BCD format. In like manner, when an MSF address, expressed in BCD, is input as the first input 32, the output of the subtractor 52 is a value corresponding to the LBA equivalent thereof, which LBA is expressed in HEX format

EXAMPLE 1

The first input 32 is an LBA of 4 Fh and the MSF equivalent thereof is needed. The decimal equivalent to 4 Fh is 79 d, where the lower case "d" denotes decimal notation. The decade selector 34, therefore, receives an input of 4 Fh, corresponding to 79 d and outputs 7 at its output 38. The decade selector output 38 is passed to the operand select 40, causing the operand select 40 to select an operand 2 Ah in the manner described above. The adder 46 adds the first input 32 (equal to 4 Fh) to the selected operand (equal to 2 Ah) and outputs h79 at its output 48. This value h79 corresponds to the MSF of the LBA of 4 Fh input at the first input 32. Indeed, the value h79 is the equivalent of 121 d, which may also be expressed as 0111 1001 b, where the lower case "b" denotes binary notation. In turn, if interpreted as 8241 BCD notation, the value 0111 1001 b is equivalent to the original LBA of 4 Fh. Thus, when the first input 32 is an LBA of 4 Fh, the output 48 of the adder 46 is the MSF equivalent 79 or 0111 1001 b in 8241 BCD notation, wherein the most significant bits 0111 correspond to 7 and the least significant bits 1001 correspond to 9.

Logically, the decade selector 34 may be seen as implementing the operation:

Floor (BCD input/10 h);

where 10 h is the equivalent of 16 d and where the "Floor" operator produces a quotient that has been truncated toward negative infinity; that is, the quotient represents the largest mathematical integer that is not larger than the mathematical quotient. The operand select 40 may be seen as logically implementing the operation:

Floor (BCD input/10 h)*6 h;

The adder 46, in turn, may be seen as carrying out the operation:

BCD input+Floor((BCD input)/10 h)*6 h to generate, at the output 48 thereof, the LBA equivalent of the inputted MSF location.

EXAMPLE 2

The first input 32 is an MSF of BCD 78 (0111 1000 b) and the LBA hexadecimal equivalent thereof is needed. When, for example, the first input 32 is an MSF of BCD 78 or 0111 1000 b, the decade selector 34 will output 7 at its output 38, as BCD 78 crosses seven decade boundaries. The operand select 40, in turn, will once again select the value 2 Ah as its operand and output same at 44. The subtractor 50 then outputs the difference of the first input 32 and the selected operand 44. In this case, the subtractor performs the subtraction 78 h–2 Ah and outputs the result 4 Eh at its output 52. The output 52 of 4 Eh, therefore, is the LBA equivalent to an MSF of BCD 78, or 0111 1000 b.

Logically, the decade selector 34 may be seen as implementing the operation:

Floor (Hex input/0 Ah);

where 0 Ah is equivalent to 10 d. Similarly, the operand select 40 may be seen as implementing the operation:

Floor (Hex input/0 Ah)*6 h;

and the subtractor 50 may be seen as implementing the operation:

Hex input–Floor (Hex input/0 Ah)*6 h to generate, at the output 52 thereof, the MSF equivalent of the inputted LBA location.

FIG. 3 is a flowchart of an embodiment of the method of converting between a logical block address (LBA) and a minute second frame (MSF) location on a data carrier, according to the present invention. As shown therein, step S1 calls for the receiving of a first input, the first input being either an LBA or a location expressed in MSF format. As shown in step S2, the decade of the received first input is determined. To do so, the number of decade boundaries crossed by the first input is determined. In step S3, an operand is selected that corresponds to the decade number determined above. According to the present invention, the operand corresponds to a multiple of 6. More particularly, the selected operand is the product of 6 and the determined decade of the first input. As shown in step S4, the first input and the selected operand are added to generate a first output, the first output being an MSF location when the received first input is an LBA address. And, as shown in step S5, the selected operand is subtracted from the first input to generate a second output, the second output being an LBA address when the received first input is an MSF location.

The present invention may also be viewed as a method of performing a seek operation on a data carrier that stores information at a location specified in a MSF format, based upon a logical block address LBA. As shown in step S1 of FIG. 3, the LBA of the information to be access on the data carrier is determined. The number of decade boundaries crossed by the LBA of the information to be accessed on the data carrier may then be determined, as shown at step S2. Step S3 calls for the selection of an operand, based upon the number of decade boundaries (multiples of 10 decimal) crossed by the LBA. At step S4, an addition operation is performed to add the selected operand to the LBA, the operand being equal to 6 multiplied by the number of decade boundaries crossed by the LBA. The result of the addition operation corresponds to the MSF location of the information to be accessed. A seek command may then be issued specifying the computed MSF location. An MSF-formatted position signal may then be received from a read-write head over the data carrier. The receipt of the MSF position signal is also shown at step S1. The number of decade boundaries crossed by the MSF position signal may then be determined, as shown at step S2. Step S3 again calls for the selection of an operand, based this time upon the number of decade boundaries (multiples of 10 decimal) crossed by the MSF-formatted position signal. At step S5, a subtraction operation is performed to subtract the selected operand from the MSF-formatted position signal, the operand being equal to 6 multiplied by the number of decade boundaries crossed by the MSF-formatted position signal. The result of the subtraction operation corresponds to an LBA representation of the MSF-formatted position signal. The LBA representation of the MSF-formatted position signal may then be compared with the LBA of the information to be accessed on the data carrier to determine whether the LBA of the information to be accessed has been reached.

While the foregoing detailed description has described certain embodiments of the present invention, it is to be understood that the above description is illustrative only and not limiting of the disclosed invention. Accordingly, the present invention to be limited only by the claims as set forth below.

What is claimed is:

1. A binary coded decimal (BCD)/hexadecimal (HEX) converter, comprising:

a decade selector, the decade selector receiving a first input, the decade selector generating a decade selector output corresponding to a decade of the first input;

an operand selector, the operand selector receiving decade selector output and outputting an operand corresponding to the decade selector output;

an adder, the adder outputting a sum of the first input and the operand, the sum being a BCD value corresponding to the first input when the first input is a HEX value, and a subtractor, the subtractor outputting a difference of the first input and the operand, the difference being a HEX value corresponding to the first input when the first input is a BCD value.

2. The converter of claim 1, wherein the decade selector is configured to receive n numbered second inputs, each of the n second inputs being tied to a respective different multiple of 10, the decade selector matching the decade of the first input to one of the multiples of 10, the decade selector output being equal to the number of the second input tied to the matching multiple of 10.

3. The converter of claim 2, wherein the operand selector is configured to receive p numbered third inputs, the number p being equal to n, each of the p third inputs being tied to a respective different multiple of 6, the operand outputted being equal to that multiple of 6 tied the numbered third input that matches the decade selector output.

4. The converter of claim 1, wherein at least one of the decade selector, the operand selector, the adder and the subtractor is implemented in firmware.

5. The converter of claim 1, wherein at least one of the decade selector, the operand selector, the adder and the subtractor is implemented in software.

6. The converter of claim 1, wherein at least one of the decade selector, the operand selector, the adder and the subtractor is implemented in hardware.

7. A method of converting between a logical block address (LBA) and a minute second frame (MSF) location on a data carrier, comprising the steps of:

receiving a first input;

determining a decade of the received first input;

selecting an operand corresponding to the determined decade;

adding the first input and the selected operand to generate a first output, the first output being an MSF location when the received first input is an LBA address, and subtracting the selected operand from the first input to generate a second output, the second output being an LBA address when the received first input is an MSF location.

8. The method of claim 7, wherein the determining step comprises the step of ascertaining a number of decade boundaries crossed by the first input.

9. The method of claim 7, wherein the determining step comprises the steps of:

receiving n numbered second inputs, each of the n second inputs being tied to a respective different multiple of 10;

matching the decade of the first input to one of the multiples of 10, the determined decade being equal to the number of the second input tied to the matching multiple of 10.

10. The method of claim 9, wherein the selecting step comprises the step of receiving p numbered third inputs, p being equal to n, each of the p third inputs being tied to a respective different multiple of 6, the operand outputted being equal to that multiple of 6 tied the numbered third input that matches the determined decade.

11. The method of claim 7, wherein the data carrier is a CD-ROM.

12. A method of performing a seek operation on a data carrier that stores information at a location specified in a minute second frame (MSF) format, based upon a logical block address (LBA), comprising the steps of:

determining a number of decade boundaries crossed by the LBA of information to be accessed on the data carrier;

performing an addition operation to add an operand to the LBA, the operand being equal to 6 multiplied by the number of decade boundaries crossed by the LBA, a result of the addition operation corresponding to a MSF location of the information to be accessed;

issuing a seek command specifying the MSF location;

receiving an MSF position signal from a read-write head over the data carrier;

performing a subtraction operation to subtract an operand from the MSF position signal, the operand being equal to 6 multiplied by the number of decade boundaries crossed by the MSF position signal, a result of the subtraction operation corresponding to an LBA representation of the MSF position signal, and comparing the LBA representation of the MSF position signal with the LBA of the information to be accessed on the data carrier to determine whether the LBA of the information to be accessed has been reached.

13. The method of claim 12, wherein the data carrier is a CD-ROM.

* * * * *